United States Patent [19]

Kyriacou

[11] 4,195,859
[45] Apr. 1, 1980

[54] VEHICLE SUSPENSION

[76] Inventor: Nestor E. Kyriacou, P.O. Box 102, Limassol, Cyprus

[21] Appl. No.: 735,056

[22] Filed: Oct. 22, 1976

[51] Int. Cl.² ............................................. B62D 65/00
[52] U.S. Cl. ................................ 280/112 R; 280/682; 267/56
[58] Field of Search ............... 280/111, 112 R, 112 A, 280/104, 682, 777, 780; 180/DIG. 2; 293/68, 85, 86; 267/56

[56] References Cited

U.S. PATENT DOCUMENTS

| | | | |
|---|---|---|---|
| 1,791,001 | 2/1931 | Rasmussen | 280/777 |
| 2,002,459 | 5/1935 | Viviano | 280/112 R |
| 2,837,176 | 6/1958 | Dropkin | 293/85 |
| 3,031,179 | 4/1962 | Peirce | 267/56 |
| 3,170,682 | 2/1965 | Eggers | 280/112 R |
| 3,243,198 | 3/1966 | Simovich | 280/112 R |
| 3,363,925 | 1/1968 | Olszewski | 293/85 |
| 3,477,307 | 11/1969 | Maddox | 280/777 |
| 3,698,737 | 10/1972 | Grant | 280/112 R |

Primary Examiner—Philip Goodman
Assistant Examiner—John A. Carroll
Attorney, Agent, or Firm—Weingarten, Maxham & Schurgin

[57] ABSTRACT

A vehicle suspension system capable of accommodating considerable upward and downward movement of individual wheels and having a lever which is pivotable relative to the chassis about an axis extending longitudinally of the vehicle against the action of a spring, one end of which is slidable transversely relative to the lever.

21 Claims, 13 Drawing Figures

VEHICLE SUSPENSION

The present invention relates to a vehicle suspension system, and has particular but not exclusive application to suspension systems for trucks or like vehicles that are to be driven over very rough terrain.

The invention provides a vehicle suspension system comprising a wheel mounted on an axle that is connected to a vehicle chassis by suspension means that includes a spring having means thereon which is slidably mounted on a lever, the lever being mounted for rotation about an axis extending transversely of the axle, whereby upon movement of the wheel upwardly and downwardly relative to the chassis, the said means on the spring slides along the lever.

Since the spring is slidably mounted relative to the lever, large upward and downward movements of the wheel can be accommodated by the suspension as the vehicle is driven over very rough terrain.

The vehicle can also have a collapsible chassis, having a bumper part movable relative to the main part of the chassis, whereby the vehicle can accommodate head-on impacts in the event of an accident. When a vehicle with such a chassis is fitted with the aforementioned suspension of the invention, the resulting arrangement has the advantage that the suspension can accommodate movement of the chassis parts without breakage.

Preferably the arrangement includes steering means for said wheel, the steering means including a collapsible linkage to prevent the linkage breaking in the event of relative movement of the chassis parts.

Preferably, the suspension system of the invention is arranged such that the spring means comprises a leaf spring pivotally mounted at one end thereof to the chassis and pivotally mounted at the other end thereof to a rod, the arm being slidably mounted in the lever. Alternatively, the suspension can include an arm pivotally mounted at one end to the chassis and attached at the other end thereof to a coil spring, and means on the coil spring which is slidably mounted in said lever. In either case, the suspension preferably includes a sway guide mounted on the chassis and having two generally parallel side walls disposed on opposite sides of the arm or leaf spring for guiding the arm or spring.

In order that the invention may be more fully understood and readily carried into effect, several preferred embodiments thereof will now be described by way of example with reference to the accompanying drawings in which.

Figure 1:
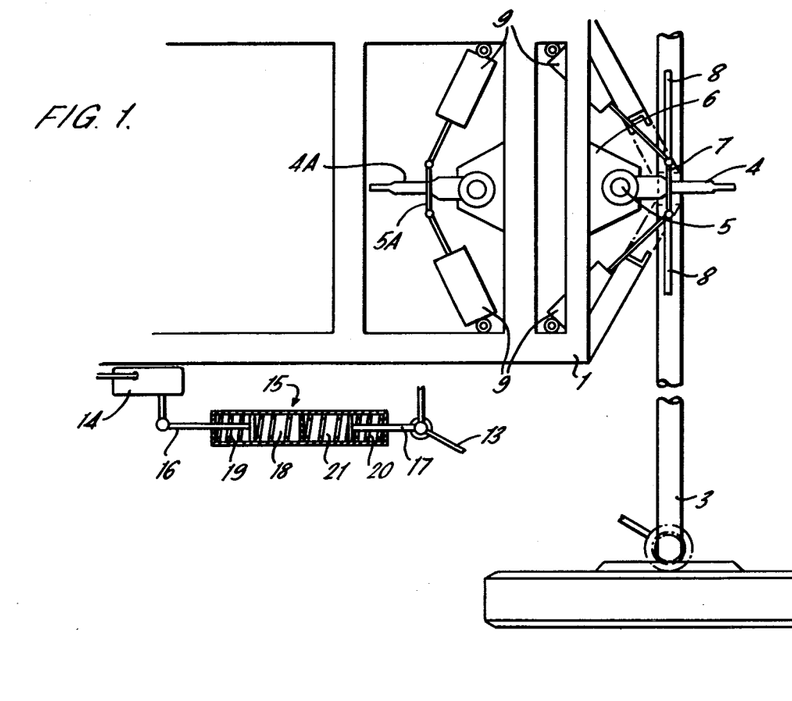
FIG. 1 is a partial plan view of a vehicle suspension system.
Figure 2:
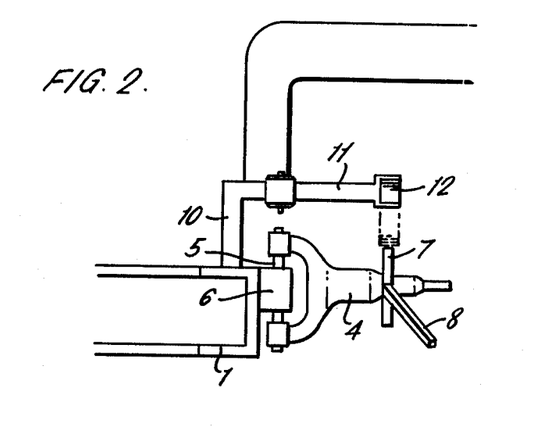
FIG. 2 is an elevational view of the suspension system.

Referring firstly to FIGS. 1 and 2, there is shown a vehicle such as a small truck having a chassis 1 and steerable road wheels 2 (only one shown) mounted on an axle 3. The axle is mounted on the chassis by means of a suspension system which will now be described in detail. The suspension system permits large movements of the wheels 2 relative to the chassis when the truck is driven over very rough terrain, and permits rearward movement of the axle in the event of a collision, for example, with a large boulder.

The system comprises a first stub shaft 4 pivotally mounted on the chassis about an axis that intersects the longitudinal centre line of the chassis 1, the shaft being mounted on a pin 5 that is mounted on a bracket 6 welded to the chassis. A flange 7 is rotatably mounted on the stub shaft 4, and the axle 3 is attached to the flange by means of arms 8, typically of steel that are welded to the axle and the flange. The axle 3 is also attached to a second stub shaft 4A which is pivotally mounted on the chassis 1 in the same way as shaft 4 and on the longitudinal centreline of the chassis but rearwardly of the shaft 4. A flange 5A is rotatably mounted on the shaft 4A. and further steel arms (not shown) provide a connection between the flange 5A and the axle 3. Each of the stub axles is urged to be aligned with the centreline of the chassis by means of two spring-loaded piston and cylinder assemblies 9 that are mounted between opposite sides of the chassis 1 and the flanges 5A and 7.

As shown in FIG. 2, a post 10 is mounted on the front of the chassis and has an extension 11 which is pivotally mounted thereon about an axis which is aligned with the axis of rotation of the shaft 4. A leaf spring 12 is fixedly mounted at its centre on the end of the extension 11, the ends of the leaf spring being slidably mounted on the axle 3 (by means not shown) on opposite sides of the centreline. Stops are provided (not shown) to limit the distance by which the spring ends can move relative to the axle 3.

When the truck is driven over rough terrain, the suspension permits up and down movement of the wheels relative to the chassis, the axle 3 and the flanges 5A and 7 then pivoting about the shafts 4 and 4A, and the ends of the spring 12 sliding along the axle to permit such rotational movement. Since the axle pivots about the centreline of the chassis, movement of the chassis as a result of the rough terrain is minimised, and the chassis can be maintained in a level configuration when the vehicle is driven transversely over a slope with one of the steered wheels 2 higher than the other.

Moreover, when one of the wheels 2 engages a large boulder or the like, the wheel can deflect rearwardly, the axle 3 then rotating about the pivot 5. The piston and cylinder assemblies 9 then urge the axle to return to its position shown in FIG. 1, and thus the likelihood of the suspension and the wheel being damaged by such a boulder is materially reduced.

The vehicle is provided with a steering mechanism for the wheels 2 that includes linkages 13 connected to a steering box 14. To prevent damage to the linkages, a spring loaded assembly 15 is connected into the linkages, the assembly including two linkage parts 16 and 17 which are connected by means of a spring 18 held partially compressed by two compression springs 19 and 20 within a cylindrical casing 21. The spring 18 is compressed sufficiently normally to transmit movement of the linkage part 16 to the part 17, but in the event of an extreme movement of the wheels 2, the spring 18 is either compressed or extended and the parts 16 and 17 move relative to one another.

Several different forms of suspension in accordance with the invention are shown in FIGS. 3 to 6.

Figure 3:
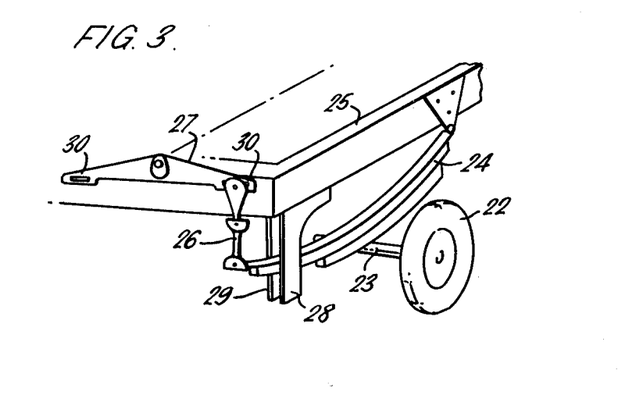
FIGS. 3 to 6 illustrate schematically, various different forms of a vehicle suspension of the invention.

In FIG. 3, a road wheel 22 is mounted on a stub axle 23 which is mounted by means of a leaf spring 24 on a vehicle chassis 25. The spring is pivotally mounted on the chassis at one end thereof, and at its other end is pivotally connected to one end of an arm 26. The other end of the arm 26 is slidably mounted in a slot 30 in a rigid or flexible lever arm 27 which is pivotally mounted on the chassis about an axis aligned with the longitudinal centreline of the chassis. The spring 24 is movable between two sway guides 28, 29. Although not shown in the Figure, another wheel is similarly mounted on the other side of the chassis to wheel 22, such that another arm similar to arm 26 is slidably received in another slot 30 in the lever arm 27.

In operation of the arrangement of FIG. 3, when the wheel 22 passes over a large boulder, it will be forced upwardly relative to the chassis, and the spring pivots relative to the chassis thereby moving the arm 26 upwardly. Thus the arm slides outwardly in the lever arm 27, and if the boulder is large enough, the arm 27 is rotated about the centreline to cause the arm received in the other slot 30 to move relative thereto and drive the other wheel positively towards the ground. Movement of the spring 24 is guided by the two sway guides 28, 29 to prevent the chassis swaying on the springs. When the wheel 22 drops into a pot-hole the arm 26 slides outwardly of the lever arm 27, and the arm 27 may, if necessary, rotate to drop the wheel into the pot-hole.

An advantage of the form of the suspension system of FIG. 3, is that because of the slidable mounting of the arm 26 in the lever arm 27, a large travel of the wheel 22 can be accommodated by the suspension system and hence the likelihood of the movement of the wheel being transmitted to the chassis is materially reduced.

Another advantage of the FIG. 3 arrangement is that in the event of a collision, the wheel can move rearwardly of the chassis without breaking the suspension. This will be described in more detail hereinafter.

Figure 4:
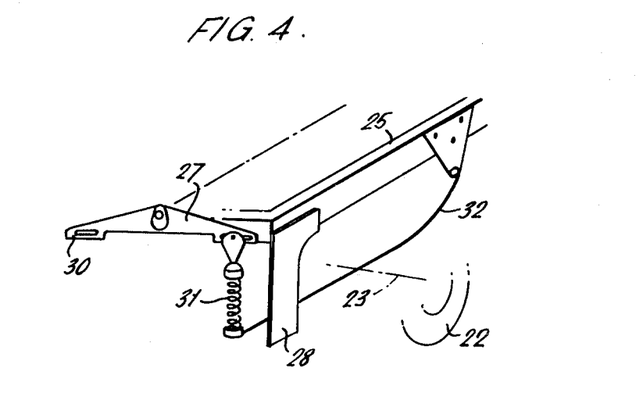

The suspension of FIG. 3 can be modified in various ways and FIG. 4 shows a modified example of the suspension which is functionally equivalent to that of FIG. 3. The leaf spring 24 of FIG. 3 is replaced by a rigid radius arm 32 and the arm 26 is replaced by a member including a coil spring 31. The leaf spring 24 and its equivalent radius arm 32 may, for purposes of this description, be termed suspension members.

Figure 5:
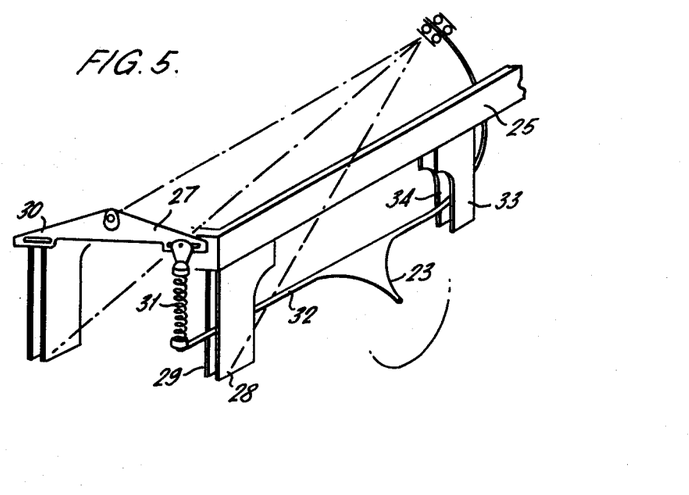

The arrangement of FIG. 5 is a modification of the suspension of FIGS. 3 and 4 in which the radius arm 32 is pivotally mounted at the longitudinal centreline of the chassis rather than at the edge of the chassis. The radius arm is guided between two sets of sway guides 28, 29 and 33, 34 on opposite sides of the wheel axle 23.

Figure 6:
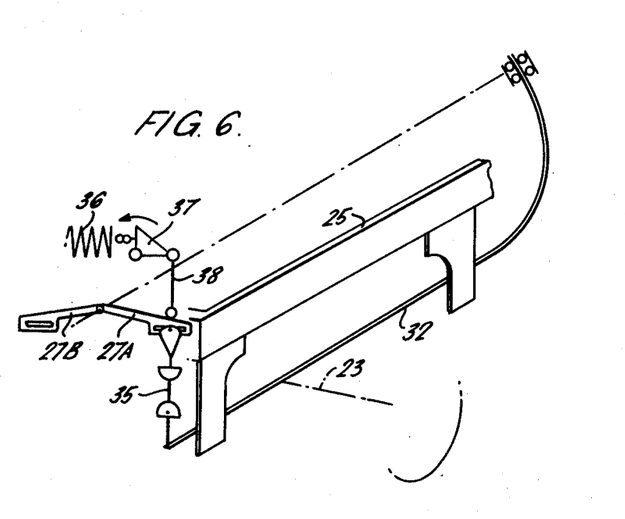

A modification of the suspension of FIG. 5 is shown in FIG. 6 in which the coil spring 31 is replaced by a rigid arm 35, but the suspension is provided with resilience by means of a spring 36 attached at one end to the chassis 25 but at its other end to a triangular lever arm 37 pivotally mounted on the chassis, the triangular lever arm being connected by a further arm 38 to the lever arm 27. The arm 27 in this example comprises two parts 27A, 27B, one for each wheel, both of which are pivotally mounted at the longitudinal centreline of the chassis. In this arrangement, it will be appreciated that an independent suspension is provided for each wheel. An advantage of the forms of suspension shown in FIGS. 5 and 6 is that since the arm 32 and the lever 27 are both pivotally mounted at the centreline of the chassis, the chassis is free to float about the centreline.

Figure 7:
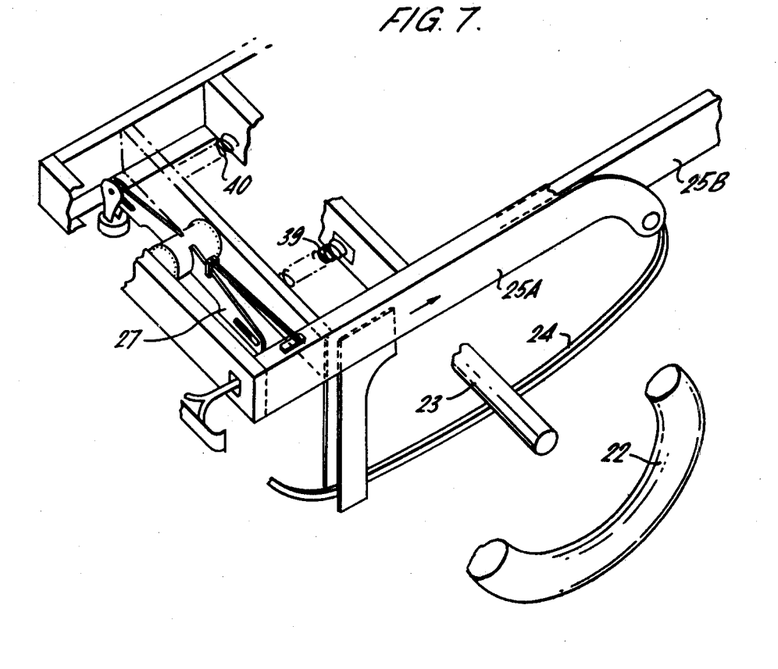
FIG. 7 is a perspective view of a vehicle having a suspension of the form shown in FIG. 3, and with a collapsible chassis.

The various arrangements of FIGS. 3 to 6 will now be described in more detail. A more practical arrangement of the kind shown in FIG. 3 will now be described with reference to FIGS. 7 and 8; like parts are marked with like reference numerals. In FIG. 7, the chassis 25 is made in two parts, a main part 25A and a bumper part 25B which is slidably mounted on the main part, the bumper part being biased outwardly of the main part by springs 39, 40.

The bumper part includes two transverse spars between which the lever arm 27 is pivotally mounted. The arrangement of the lever arm 27 and the arm 26 is shown in more detail in FIG. 8. The arm includes slots 30, 30A at opposite ends thereof in which the arms 26 (only one shown) are slidably mounted by means of roller bearings 41. Each arm 26 is pivotally mounted by means of a bolt 42, to a clamp 43 which is clamped fast to the end of the spring 24.

Figure 8:
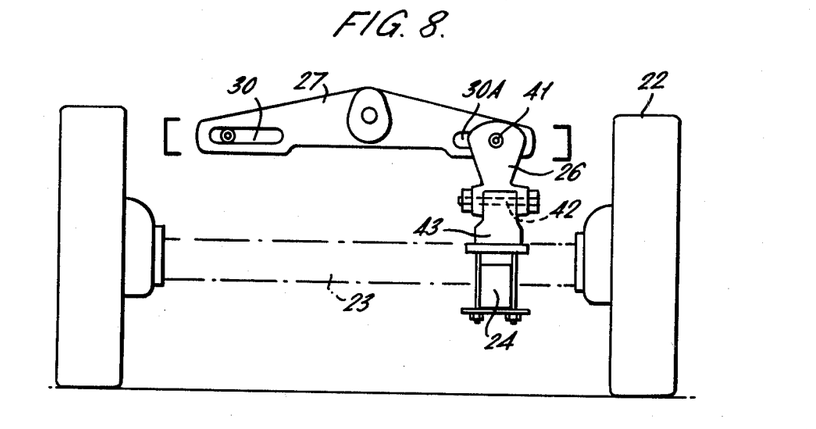
FIG. 8 is a part sectional view of the arrangement of FIG. 7.

Thus, in the event of an accident during which the bumper part 25B of the chassis is driven back against the bias of springs 39, 40 and due to the arrangement of the arms 26, 27 and the leaf springs 24, the suspension is capable of accommodating the change in configuration of the chassis without breakage or damage. Thus, as long as the impact force imparted to the vehicle is not too great, it is possible for the vehicle to withstand the impact of a head-on collision without structural damage to the chassis or the suspension.

Figure 9:
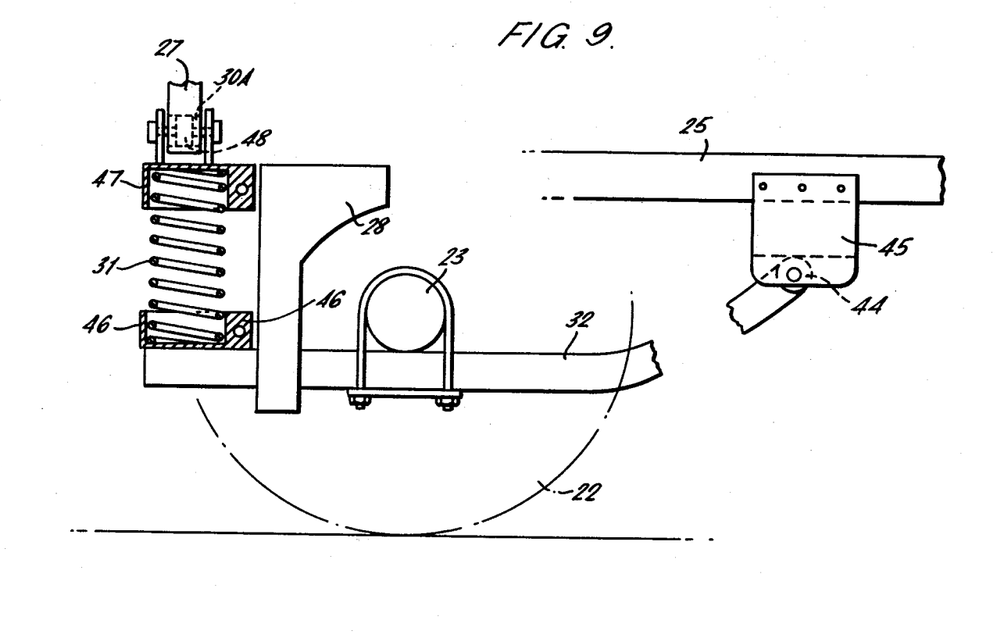
FIG. 9 is a schematic elevational view of the vehicle suspension system of the general kind shown in FIG. 4.
Figure 10:
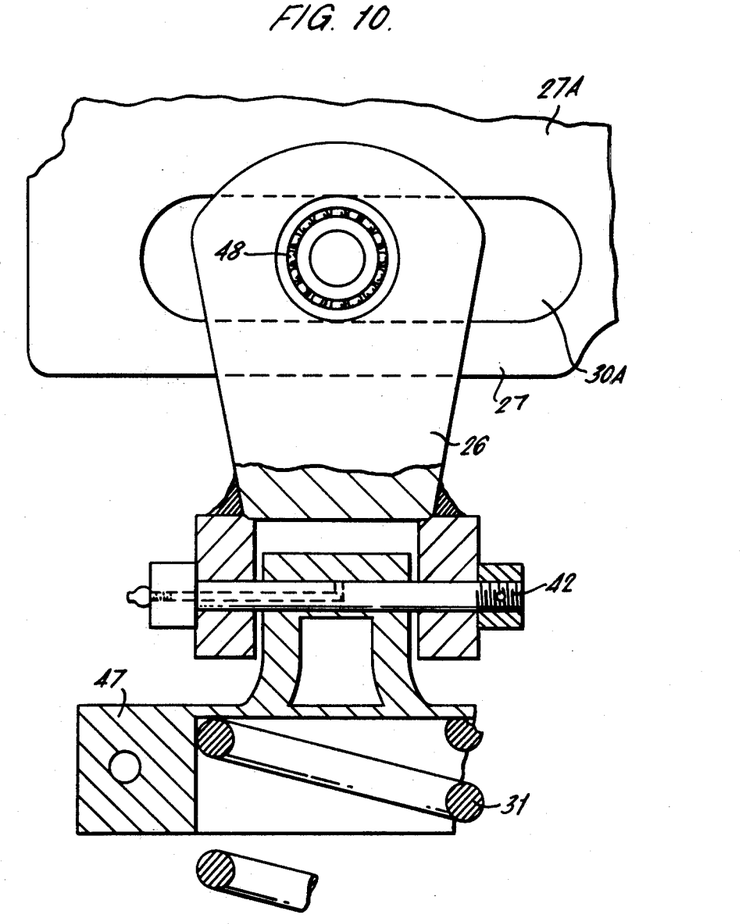
FIG. 10 is a more detailed view of the connection of the arm 27 to the coil spring 31 of FIG. 9.

A more detailed description of the suspension of FIG. 4 will now be provided with reference to FIGS. 9 and 10. The rigid arm 32 is pivotally mounted at one end on the chassis by means of a bush 44 between two plates 45. The spring 31, which comprises a coiled compression spring, is attached to the other end of the arm 32 by means of a collar 46. The spring 31 is also gripped by a collar 47 which is slidably mounted in a slot 30A in the arm 27 by means of a roller bearing 48. The bearing arrangement 48 is shown in more detail in FIG. 10. The collar 47, as shown, is attached to a member 26 holding the bearing 48 and pivoted on a pin 42.

Figure 11:
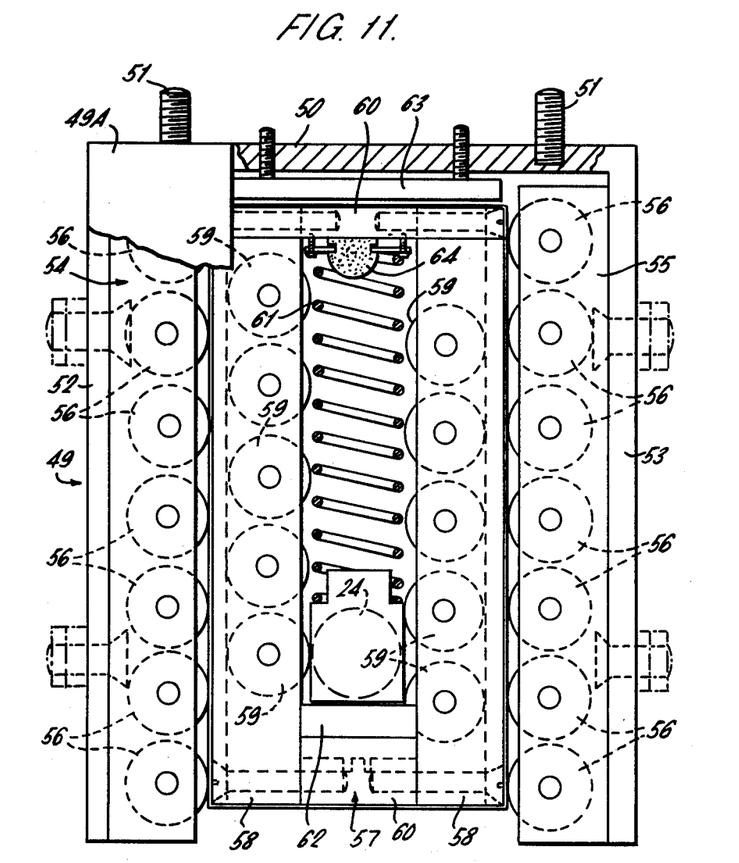
FIG. 11 is an end view of a sway guide which can be used in the suspension systems of FIGS. 3 to 6.

One form of sway guide which is suitable for use in the embodiments described with reference to FIGS. 3 to 10 is shown in FIG. 11. The sway guide comprises a rectangular, generally U-shaped frame 49 having a web portion 50 which is attached to the chassis 25 by means of bolts 51, and two side walls 52, 53. Cradles 54, 55, each containing a number of roller bearings 56 are secured inwardly of the side walls by bolting, such that the roller bearings present two vertically disposed bearing surfaces to a carriage 57 received between the cradles and laterally constrained within the frame 49 by cover plates (not shown) mounted on the open sides of the frame. Thus the carriage 57 is movable up and down between the surfaces. The carriage comprises two opposed side members 58 in each of which a number of roller bearings 59 are journalled. The side members are mounted on spacer members 60, such that the bearings 59 present two bearing surfaces which are parallel to one another and between which the leaf spring 24 of FIG. 3 (or the arm 32 of FIG. 4, 5 or 6) is received. A spring 61 having its upper end mounted on the uppermost spacer member 60, is arranged to urge the carriage upwardly relative to the spring 24 such that the spring rests against a stop 62.

In use of the sway guide, the leaf spring 24 or arm 32 is constrained to move in a direction generally parallel to the side walls 52, 53, and when the leaf spring moves downwardly, it carries the carriage 57 with it. However, when the spring 24 moves upwardly from the position shown in FIG. 11, the carriage 57 remains held against a stop 63, and the leaf spring 24 compresses spring 61 and moves towards a stop 64.

Figure 12:
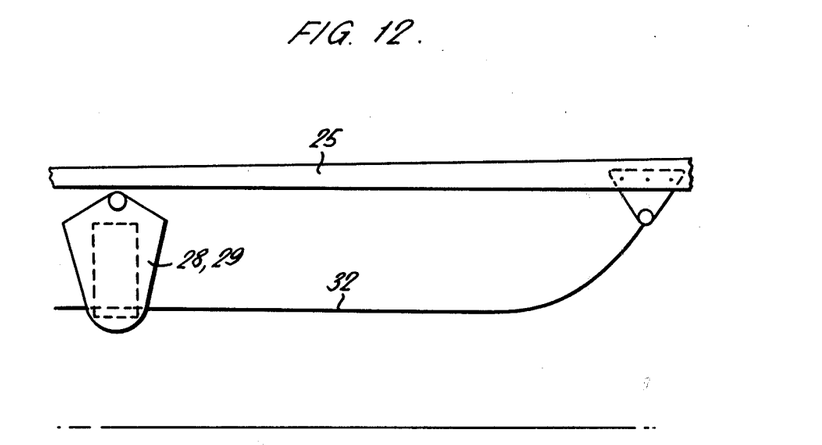
FIG. 12 illustrates a modification to the sway guide of FIG. 11.

One disadvantage of this kind of sway guide, is that in some configurations of suspension in accordance with the invention, the spring 24 (or arm 32) may move appreciably in a transverse direction to the roller bearings in the sway guide due to the pivotal movement of the spring 24 about, for example, the bush 44 of FIG. 9. Such transverse movement tends to cause premature wear of the roller bearings. One way of overcoming this problem is to pivotally mount the sway guide on the chassis 25 for movement about an axis generally parallel to the pivot axis of the spring 24 or arm 32. Such an arrangement is shown in FIG. 12.

Figure 13:
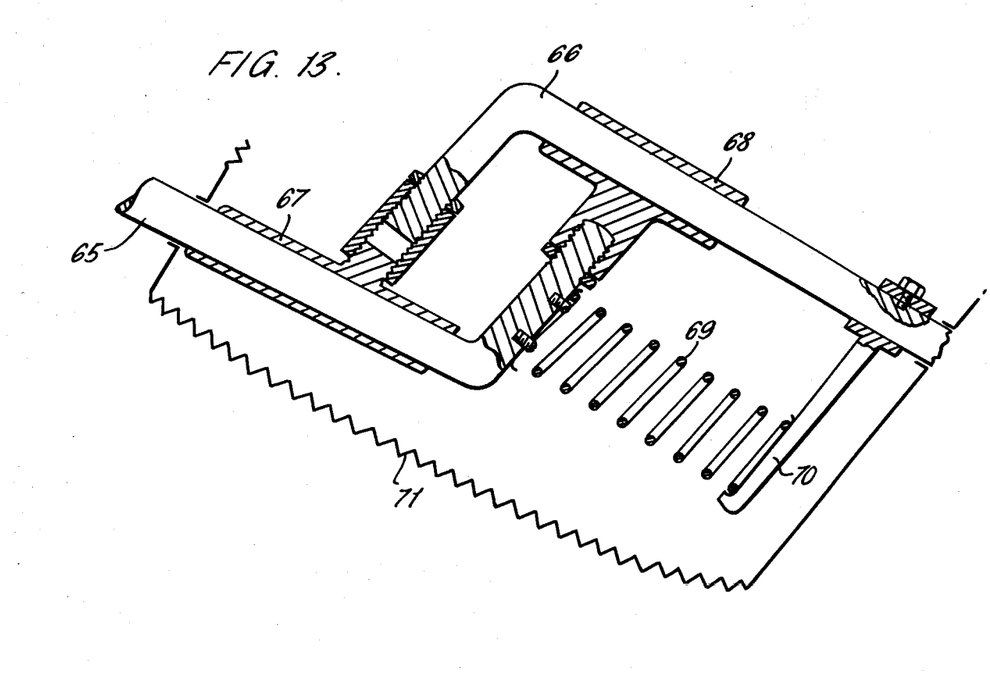
FIG. 13 is a schematic sectional view of a collapsible steering shaft for use with the suspension systems shown in the previous Figures.

As described with reference to FIGS. 1 and 2, to prevent damage to a steering mechanism for the wheels, it is useful to employ a resiliently deformable steering linkage. A form of steering shaft which has particular application to the embodiments described with reference to FIGS. 3, 7 and 8 will now be described. Referring now to FIG. 13, rods 65 and 66 form part of a steering linkage and are connected to a steering wheel and a steering box, respectively. The rods 65, 66 each have an orthogonal end portion directed toward the other one of the rods, the end portions being received in collars 67, 68 on the rods. The rods are thus slidably connected to one another. A compression spring 69 extends between the orthogonal portion of the rod 65 and a stop 70 which is bolted to the rod 66. The linkage is housed within a flexible dust cover. Thus, when the chassis parts 25A, 25B (FIG. 7) move together, the rods 65, 66 slide relative to one another to accommodate the movement whilst still being capable of performing their function. When the chassis parts are restored to their normal position, the spring urges the rods 65, 66 back to their position shown in FIG. 13.

Many other improvements and modifications of the suspension system will readily be apparent to those skilled in the art without departing from the scope of the invention defined in the following claims.

I claim:

1. A wheeled vehicle, at least one wheel of which is mounted on an axle connected to the body structure of said vehicle by a suspension system which comprises:
   an elongated lever arranged transversely with respect to said body structure;
   means for pivotably connecting said lever to said body structure on the longitudinal center line thereof whereby the ends of said lever move in a plane substantially normal to the surface upon which said wheels are supported;
   an elongated suspension member pivotably connected at one end to said body structure, said axle being mounted to said suspension member;
   means slidably coupling the other end of said suspension member to said lever, said slidable coupling means permitting motion of said coupling means and said other end of said suspension member with respect to the longitudinal dimension of said lever;
   spring means urging said wheel downwardly with respect to said body structure; and
   sway guide means formed with guide surfaces disposed on opposite sides of said suspension member, said sway guide means being mounted to said body structure for restricting lateral, while permitting vertical, displacement of said coupling means and said other end of said suspension member with respect to said body structure upon deflection of said wheel relative to said body structure.

2. A vehicle in accordance with claim 1 wherein said sway guide comprises a carriage having side portions carrying roller bearings between which said suspension means is received, said carriage being mounted for movement between roller bearings mounted on said guide surfaces.

3. A vehicle in accordance with claim 1, characterized in that the vehicle has a chassis comprising a main part and a bumper part mounted on the main part for movement relative thereto, and spring means urging the parts apart.

4. A vehicle in accordance with claim 3 wherein said lever is pivotally mounted on said bumper part, said suspension member being pivotally mounted on the main part.

5. A vehicle in accordance with claim 3, characterised in that the bumper part is slidably mounted on the main part.

6. A vehicle in accordance with claim 1 wherein said suspension member comprises a substantially rigid radius arm.

7. A vehicle in accordance with claim 6 wherein said pivotable connection of said radius arm is on the longitudinal center line of said body structure.

8. A vehicle in accordance with claim 1 wherein said suspension member comprises a leaf spring.

9. A vehicle in accordance with claim 1 wherein the spring means comprises a compression spring mounted on the body structure to resist upward rotation of the lever, said slidable coupling means comprising a rod pivotally mounted at one end to said suspension member and slidably mounted at its other end to said lever.

10. In a vehicle having a body structure and support members for supporting said body structure above a surface over which the vehicle is to move, a suspension system interposed between said body structure and at least one of said support members, said suspension system comprising:
   an elongated lever arranged transversely with respect to said body structure;
   means for pivotably connecting said lever to said body structure on the longitudinal centre line thereof whereby the ends of said lever move in a plane substantially normal to the surface;
   an elongated suspension member pivotally connected at one end to said body structure;
   means slidably coupling the other end of said suspension member to said lever, said slidable coupling means permitting motion of said coupling means and said other end of said suspension member with respect to the longitudinal dimension of said lever; and
   guide means mounted to said body structure for restricting lateral, while permitting vertical, displacement of said coupling means and said other end of said suspension member with respect to said body structure;

said support member being connected to said suspension member and being urged downwardly toward the surface relative to said body structure by said suspension member and said coupling means.

11. A vehicle in accordance with claim 10 wherein said body structure includes a vehicle chassis and said support members comprise wheels.

12. A vehicle in accordance with claim 10 wherein said connecting means includes a longitudinally extending arm attached to said support member, said arm being mounted at one end thereof on the body structure.

13. A vehicle in accordance with claim 12 wherein the mounting of the arm on the body structure is aligned with the longitudinal centreline of the body structure.

14. A vehicle in accordance with claim 12 wherein said guide comprises a sway guide mounted on the body and including means defining guide surfaces disposed on opposite sides of said arm and in such a manner as to guide said arm along a predetermined path upon deflection of the support member relative to the body structure.

15. A vehicle in accordance with claim 1 wherein said suspension member comprises a substantially rigid radius arm.

16. A vehicle in accordance with claim 15 wherein said pivotable connection of said radius arm is on the longitudinal center line of said body structure.

17. A vehicle in accordance with claim 9 wherein said suspension member comprises a substantially rigid radius arm.

18. A vehicle in accordance with claim 17 wherein said pivotable connection of said radius arm is on the longitudinal center line of said body structure.

19. A suspension system in accordance with claim 10 wherein said pivotable connection of said suspension member to said body structure is located on the longitudinal center line of said body structure.

20. A suspension system in accordance with claim 10 wherein said guide means comprises a sway guide formed with two generally parallel side walls disposed on opposite sides of said suspension member.

21. A suspension system in accordance with claim 20 wherein said sway guide includes roller bearings for guiding said suspension member.

* * * * *